United States Patent
Lu (10) Patent No.: US 10,428,851 B2
(45) Date of Patent: Oct. 1, 2019

(54) TELESCOPIC DEVICE AND TRIPOD HAVING THE TELESCOPIC DEVICE

(71) Applicant: NINGBO WEIFENG IMAGE EQUIPMENT GROUP CO., LTD., Zhejiang (CN)

(72) Inventor: Weiming Lu, Zhejiang (CN)

(73) Assignee: NINGBO WEIFENG IMAGE EQUIPMENT GROUP CO., LTD., Zhejiang (CN)

( * ) Notice: Subject to any disclaimer, the term of this patent is extended or adjusted under 35 U.S.C. 154(b) by 0 days.

(21) Appl. No.: 15/244,630

(22) Filed: Aug. 23, 2016

(65) Prior Publication Data

US 2017/0261020 A1  Sep. 14, 2017

(30) Foreign Application Priority Data

Mar. 11, 2016 (CN) ..................... 2016 2 0188364 U (51) Int. Cl.
*F16B 7/14* (2006.01)
*F16B 7/10* (2006.01)
*F16B 21/02* (2006.01)
*F16M 11/32* (2006.01)
*F16M 11/28* (2006.01)

(52) U.S. Cl.
CPC ................ *F16B 7/149* (2013.01); *F16B 7/14* (2013.01); *F16M 11/32* (2013.01); *F16B 7/1427* (2013.01); *F16B 21/02* (2013.01); *F16M 11/28* (2013.01); *F16M 2200/027* (2013.01)

(58) Field of Classification Search
CPC .. F16M 11/28; F16M 11/32; F16M 2200/027; F16B 7/149; F16B 7/1427; F16B 7/14
USPC ... 248/188.5, 88.8, 168, 170, 412, 423, 429, 248/177.1
See application file for complete search history.

(56) References Cited

U.S. PATENT DOCUMENTS

| | | | | |
|---|---|---|---|---|
| 4,105,346 A | * | 8/1978 | Gelinas | F16B 7/1427 16/429 |
| 5,458,427 A | * | 10/1995 | Simond | A63C 11/221 280/820 |
| 6,006,399 A | * | 12/1999 | Massaro | A47L 9/244 138/114 |
| 6,761,501 B1 | * | 7/2004 | Nakatani | F16B 7/14 403/109.2 |
| 2017/0261020 A1 | * | 9/2017 | Lu | F16M 11/32 |

FOREIGN PATENT DOCUMENTS

CN           204664079 U   *   9/2015

* cited by examiner

*Primary Examiner* — Tan Le
(74) *Attorney, Agent, or Firm* — Wood, Phillips, Katz, Clark & Mortimer (57) ABSTRACT

A telescopic device including an outer pipe, an inner pipe fitted in the outer pipe, and a sleeve disposed between the outer pipe and the inner pipe. The telescopic device contains a lock mechanism, containing two bosses, and located between the inner pipe and the outer pipe. A tripod is also provided.

10 Claims, 8 Drawing Sheets

TELESCOPIC DEVICE AND TRIPOD HAVING THE TELESCOPIC DEVICE

BACKGROUND OF THE INVENTION

Field of the Invention

The present invention relates to a telescopic device and a tripod having the telescopic device.

Description of the Prior Art

A conventional telescopic device comprises an outer pipe and an inner pipe fitted in the outer pipe. One end of the inner pipe can extend out of the outer pipe. A lock mechanism is provided between the inner pipe and the outer pipe. The existing lock mechanism adopts a spring fastener. The lock mechanism of the telescopic device is used with a click to make a noise. The parts of the spring fastener are small in size, so the parts may be lost easily to influence the normal function of the telescopic device. The outer pipe is formed with a plurality of engaging holes, and the extension length of the inner pipe cannot be adjusted at will. Accordingly, the inventor of the present invention has devoted himself based on his many years of practical experiences to solve these problems.

SUMMARY OF THE INVENTION

The primary object of the present invention is to provide a telescopic device which won't make a noise. Its parts won't be lost, and the length of the telescopic device is adjustable.

Another object of the present invention is to provide a tripod which won't make a noise. Its parts won't be lost, and the length of the tripod is adjustable.

According to one aspect of the present invention, a telescopic device is provided. The telescopic device comprises an outer pipe, an inner pipe fitted in the outer pipe, and a sleeve disposed between the outer pipe and the inner pipe. One end of the inner pipe extends out of the outer pipe. An outer surface of the inner pipe is formed with a slide trough. An inner surface of the sleeve is provided with a slide block engaged in the slide trough. At least one lock mechanism is provided between the outer pipe and the sleeve. The lock mechanism comprises two bosses to hold against each other. The two bosses are integrally formed on an inner surface of the outer pipe and an outer surface of the sleeve respectively. The two bosses engage with or disengage from each other when the outer pipe and the inner pipe are turned relatively.

Preferably, a top end of the inner pipe is installed with a positioning sleeve, and the positioning sleeve is disposed above the sleeve.

Preferably, the inner pipe is formed with a positioning hole, and the positioning sleeve is provided with a positioning block to mate with the positioning hole.

Preferably, the positioning sleeve is composed of two semi sleeves to mate with each other.

Preferably, the positioning sleeve is integrally formed with another boss.

Preferably, each boss is a wedge disposed in an axial direction.

Preferably, each boss is a curved protrusion disposed in an axial direction.

Preferably, the outer pipe is formed with an elongate groove in a circumferential direction, and the sleeve is provided with a positioning stud to slide in the elongate groove.

Preferably, the outer surface of the sleeve is formed with a groove, and the inner surface of the outer pipe is provided with a protruding block to slide along the groove.

According to another aspect of the present invention, a tripod is provided. The tripod comprises a base and three poles pivotally connected to a periphery of the base. Each pole comprises the aforesaid telescopic device.

Compared to the prior art, the inner and outer pipes of the present invention are turned relatively to bring the two opposing bosses to engage with each so as to lock the telescopic device. The bosses are integrally formed on the outer pipe and the sleeve, respectively. The present invention can decrease the parts and avoid losing parts. The telescopic device can be locked or unlocked by means of rotation, so it is convenient for operation.

DESCRIPTION OF THE PREFERRED EMBODIMENTS

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided as examples so that this disclosure will be thorough and complete, and will fully convey the aspects and features of the present invention to those skilled in the art.

Figure 1:
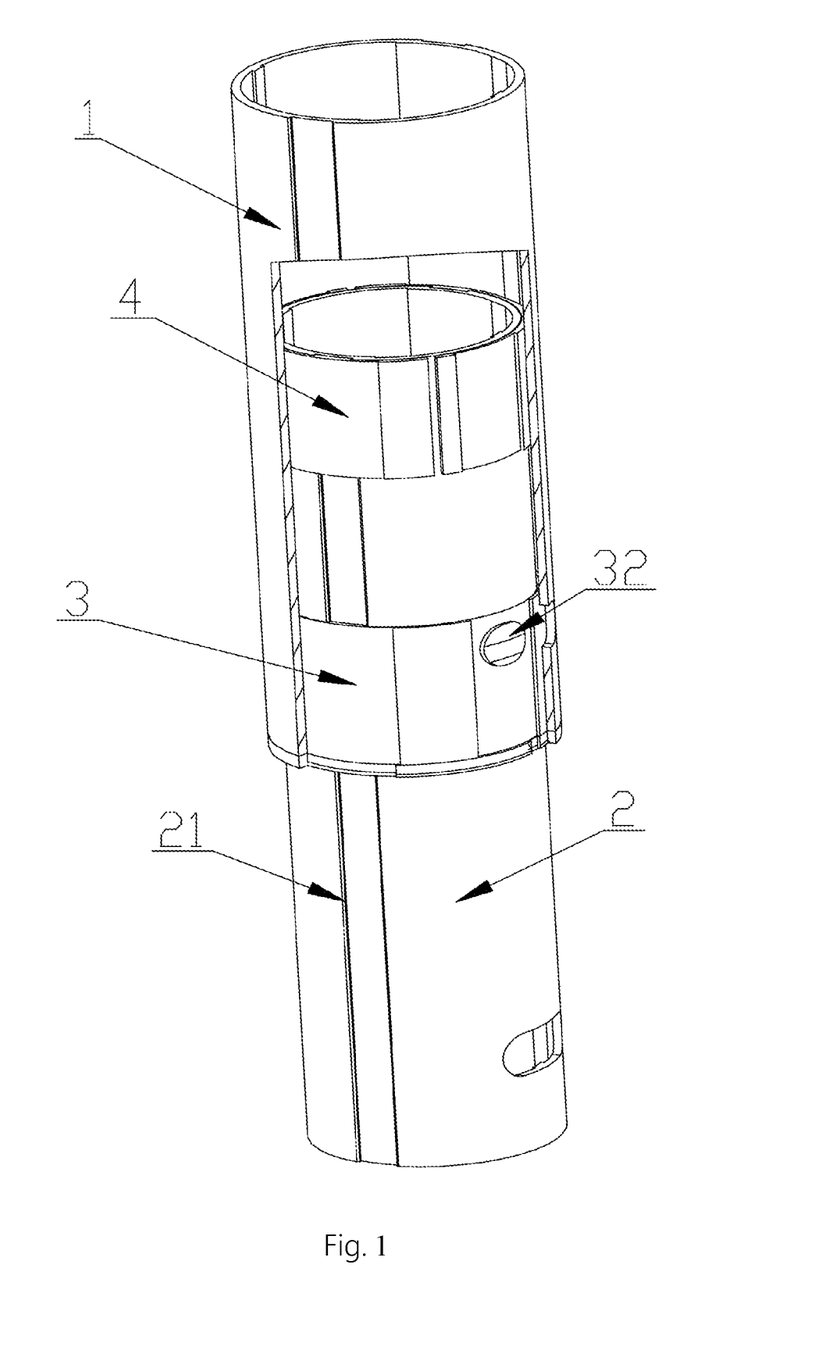
FIG. 1 is a perspective view of the telescopic device in accordance with a first embodiment of the present invention.
Figure 2:
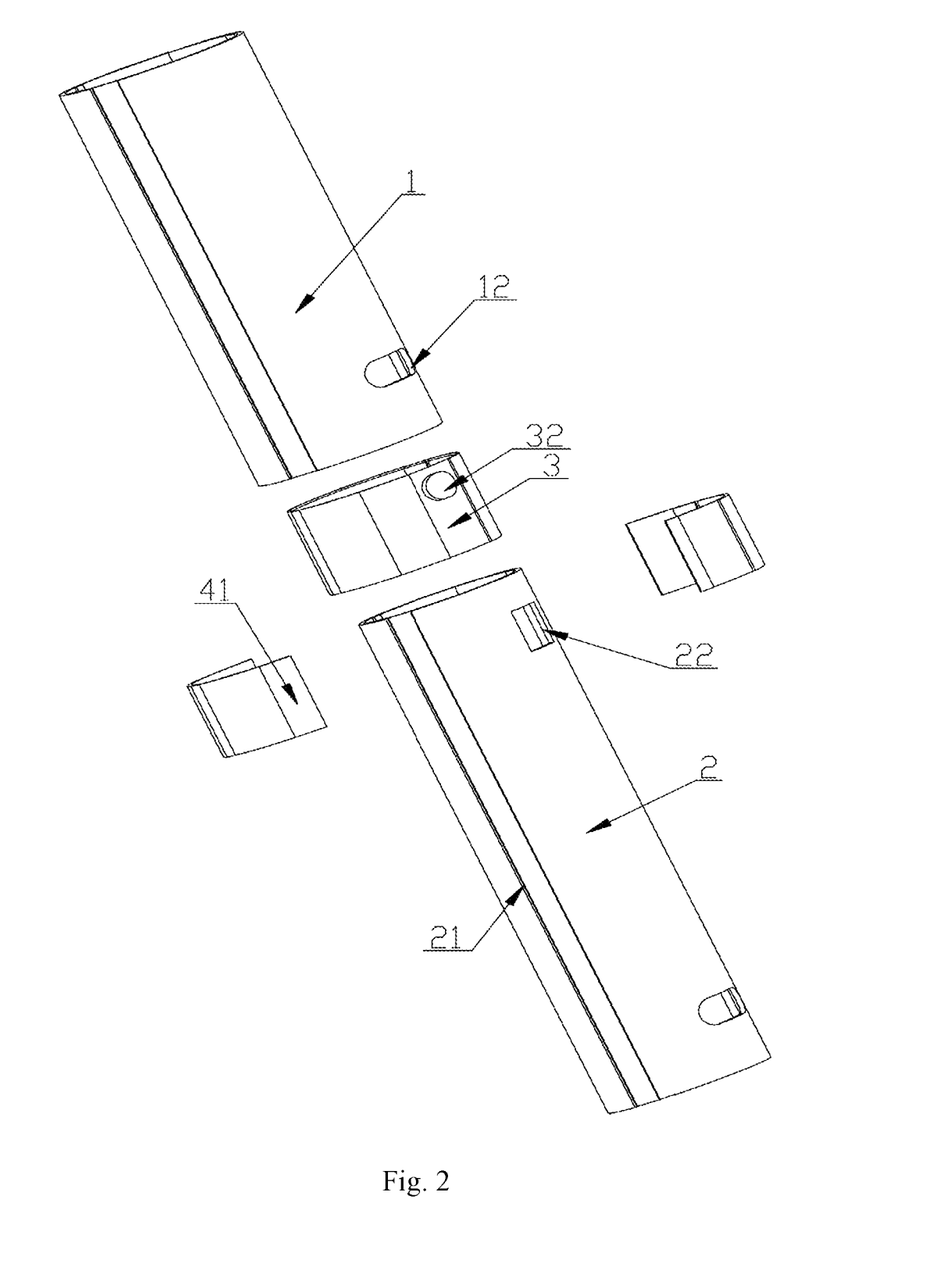
FIG. 2 is an exploded view of the telescopic device in accordance with the first embodiment of the present invention.
Figure 3:
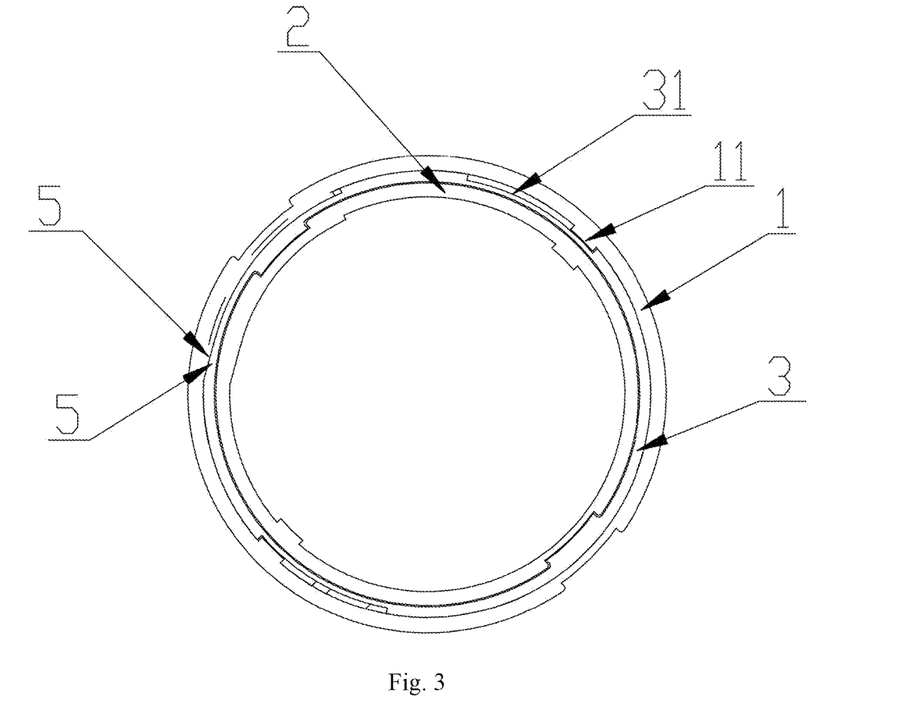
FIG. 3 is a transverse sectional view of the telescopic device in accordance with the first embodiment of the present invention.

FIG. 1 is a perspective view of the telescopic device in accordance with a first embodiment of the present invention. FIG. 2 is an exploded view of the telescopic device in accordance with the first embodiment of the present invention. FIG. 3 is a transverse sectional view of the telescopic device in accordance with the first embodiment of the present invention. The telescopic device comprises an outer pipe 1, an inner pipe 2 fitted in the outer pipe 1, and a sleeve 3 disposed between the outer pipe 1 and the inner pipe 2. One end of the inner pipe 2 extends out of the outer pipe 1. An outer surface of the inner pipe 2 is formed with a slide trough 21. An inner surface of the sleeve 3 is provided with a slide block (not shown in the drawings) engaged in the slide trough 21. A lock mechanism is provided between the outer pipe 1 and the sleeve 3. The lock mechanism comprises two bosses 5 to hold against each other. The two bosses are integrally formed on an inner surface of the outer pipe 1 and an outer surface of the sleeve 3, respectively. A gap is defined between the boss of the outer pipe 1 and the outer surface (the outer surface except the boss) of the sleeve 3. Another gap is defined between the boss of the sleeve 3 and the inner surface (the inner surface except the boss) of the outer pipe 1. The two bosses engage with or disengage from each other when the inner pipe 2 and the outer pipe 1 are turned relatively.

A top end of the inner pipe 2 is installed with a positioning sleeve 4. The positioning sleeve 4 is disposed above the sleeve 3 to limit the extension length of the inner pipe and prevent the inner pipe from coming off the outer pipe.

The inner pipe 2 is formed with a positioning hole 22. The positioning sleeve 4 is provided with a positioning block (not shown in the drawings) to mate with the positioning hole 22.

The positioning sleeve 4 is composed of two semi sleeves 41 to mate with each other. It is convenient for installation of the positioning sleeve. Each semi sleeve 41 is provided with the positioning block for the two semi sleeves 41 to be secured and installed on the inner pipe.

The positioning sleeve 4 is also integrally formed with another boss 5. The boss 5 of the positioning sleeve 4 holds against the boss 5 of the outer pipe 1. A gap is defined between the boss 5 of the positioning sleeve 4 and the inner surface (the inner surface except the boss) of the outer pipe. Between the positioning sleeve 4 and the outer pipe is also formed with a lock mechanism. The prevent invention provides a dual-lock configuration to enhance the lock force.

The boss 5 is a wedge disposed in an axial direction. The boss 5 may be a curved protrusion disposed in an axial direction. One of the two bosses may be a wedge, and the other may be a curved protrusion. The two bosses may be wedges disposed in a staggered manner. The two bosses may be curved protrusions.

The outer pipe 1 is formed with an elongate groove 12 in a circumferential direction. The sleeve 3 is provided with a positioning stud 32 to slide in the elongate groove 12 so as to position the sleeve and limit the rotational angle of the inner and outer pipes, preventing a jam phenomenon due to over-rotation.

The outer surface of the sleeve 3 is formed with a groove 31. The inner surface of the outer pipe 1 is provided with a protruding block 11 to slide along the groove 31 further to limit the rotational angle of the inner and outer pipes, preventing a jam phenomenon due to over-rotation.

When in use, the inner and outer pipes are turned relatively to bring the sleeve and the outer pipe to turn relatively, such that the two bosses disengage from each other. After disengagement, the inner pipe can extend and retract freely. After the inner pipe is adjusted to a desired length, the inner and outer pipes are turned relatively for the two bosses to engage with each other so as to lock the inner and outer pipes. The present invention can decrease the parts and avoid losing parts. The telescopic device can be locked or unlocked by means of rotation, so it can be operated conveniently.

Figure 4:
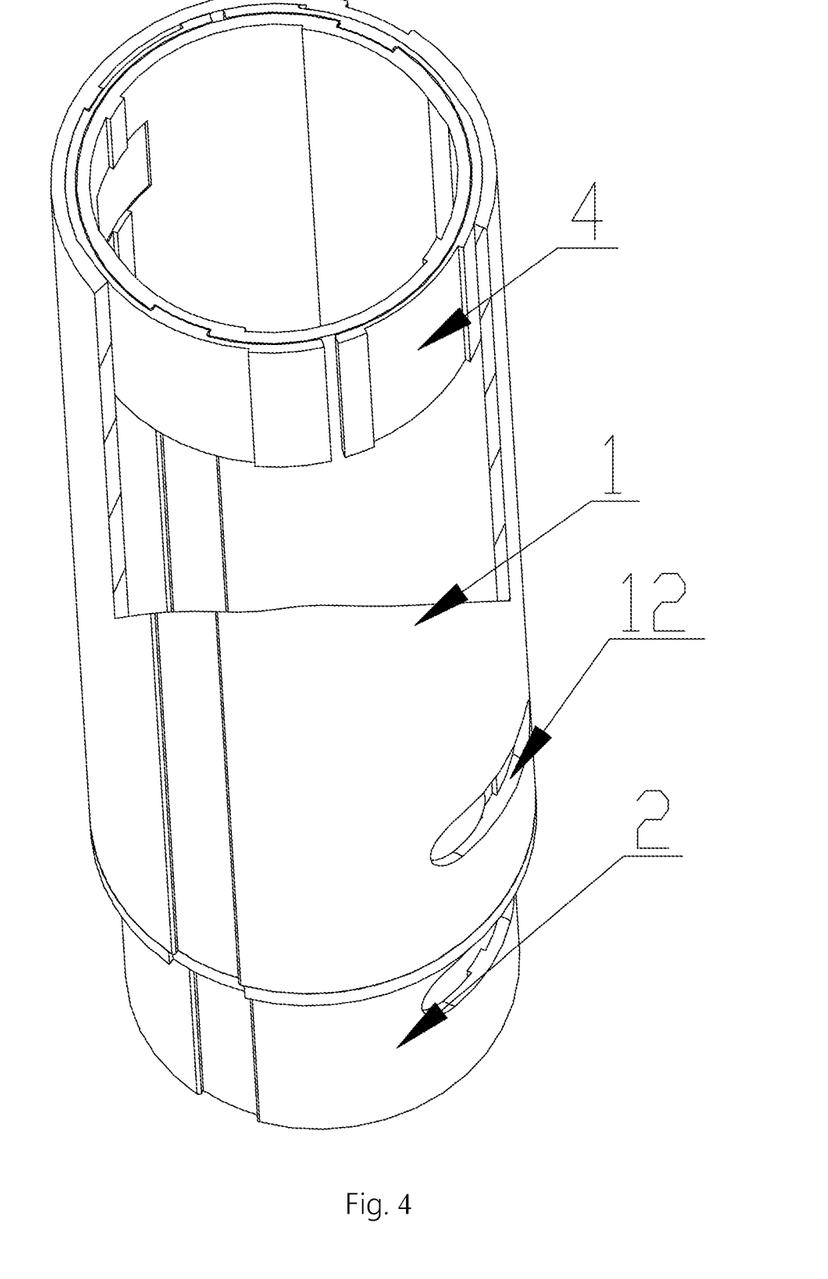
FIG. 4 is a perspective view of the telescopic device in accordance with a second embodiment of the present invention.
Figure 5:
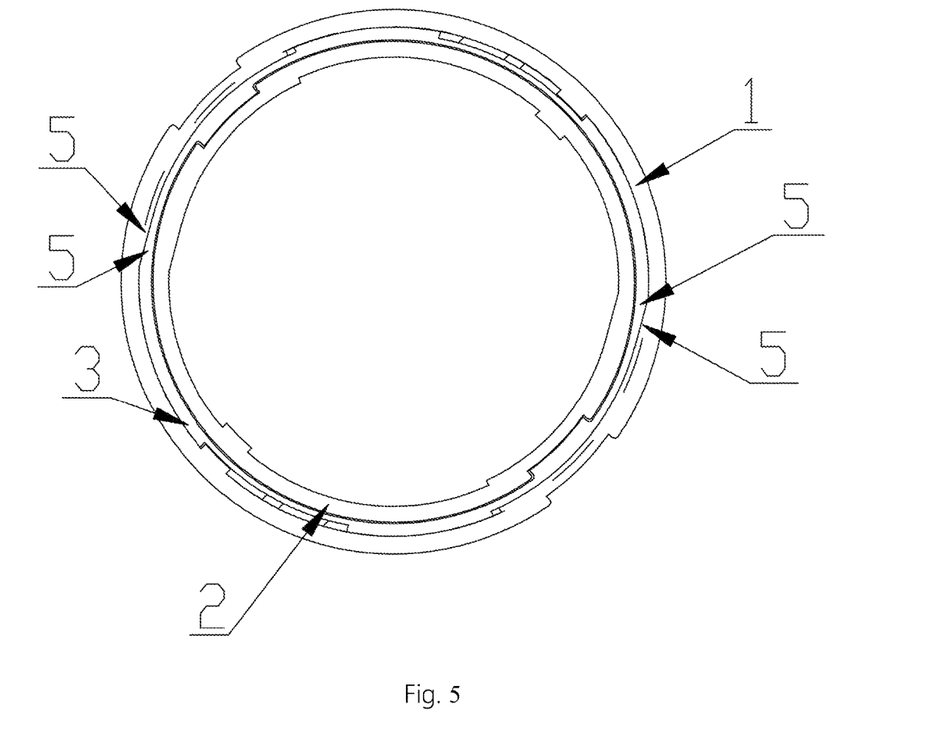
FIG. 5 is a top view of the telescopic device in accordance with the second embodiment of the present invention.

FIG. 4 and FIG. 5 show a second embodiment of the present invention. The second embodiment is substantially similar to the first embodiment with the exceptions described hereinafter. The second embodiment has two lock mechanisms. The two lock mechanisms are arranged evenly to enhance the lock force.

Figure 6:
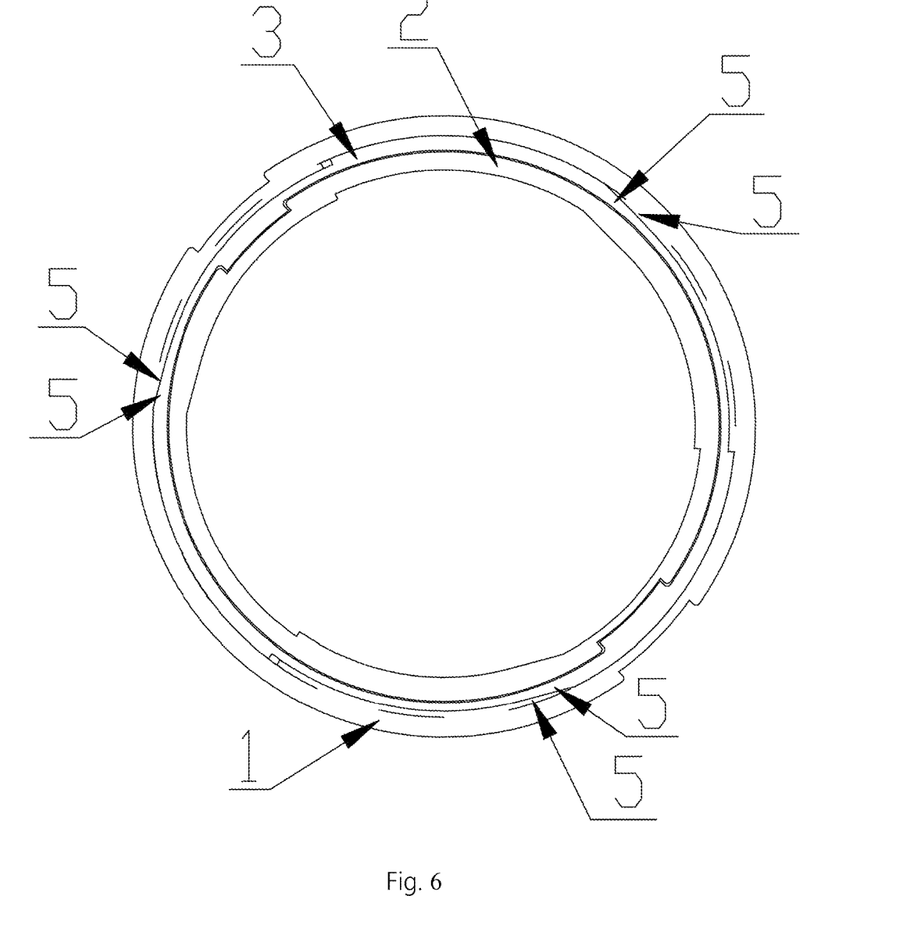
FIG. 6 is a top view of the telescopic device in accordance with a third embodiment of the present invention.

FIG. 6 shows a third embodiment of the present invention. The third embodiment is substantially similar to the first embodiment with the exceptions described hereinafter. The third embodiment has three lock mechanisms. The three lock mechanisms are arranged evenly to enhance the lock force.

Figure 7:
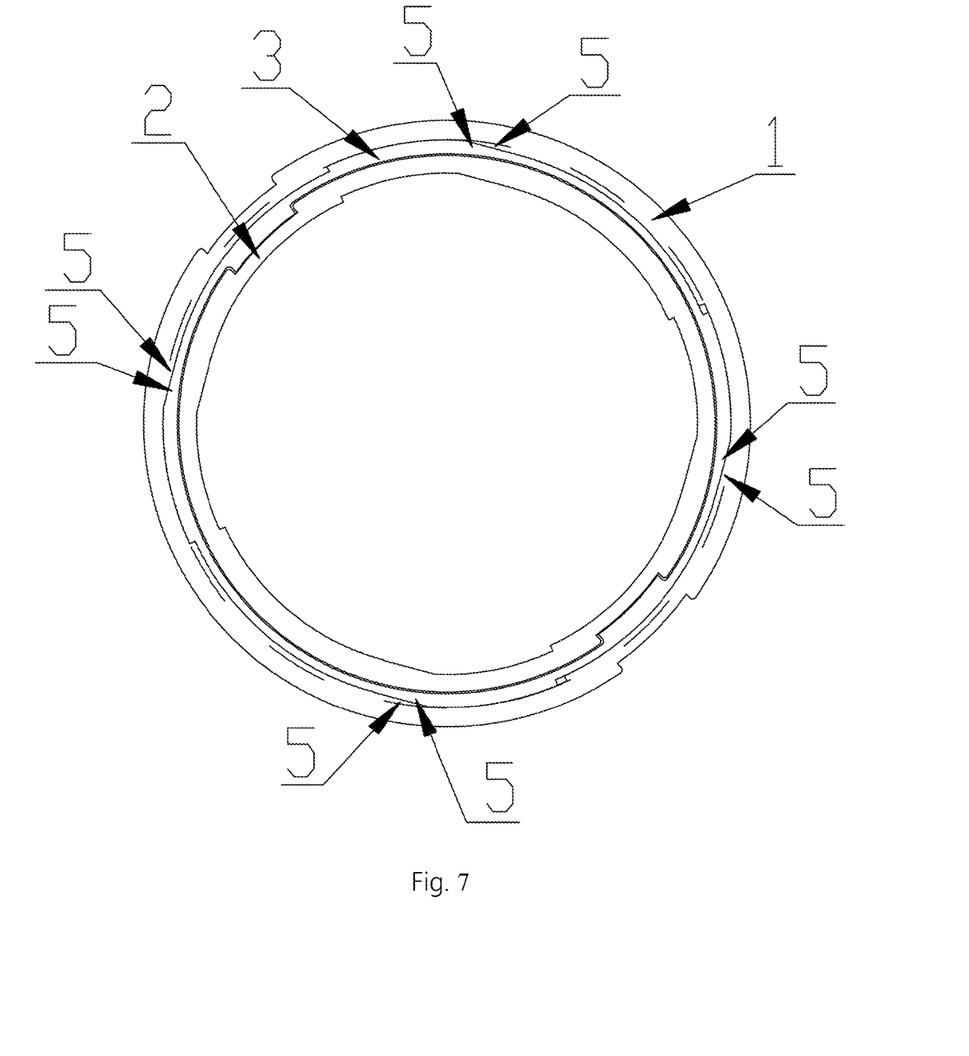
FIG. 7 is a top view of the telescopic device in accordance with a fourth embodiment of the present invention.

FIG. 7 shows a fourth embodiment of the present invention. The fourth embodiment is substantially similar to the first embodiment with the exceptions described hereinafter. The fourth embodiment has four lock mechanisms. The fourth lock mechanisms are arranged evenly to enhance the lock force.

Figure 8:
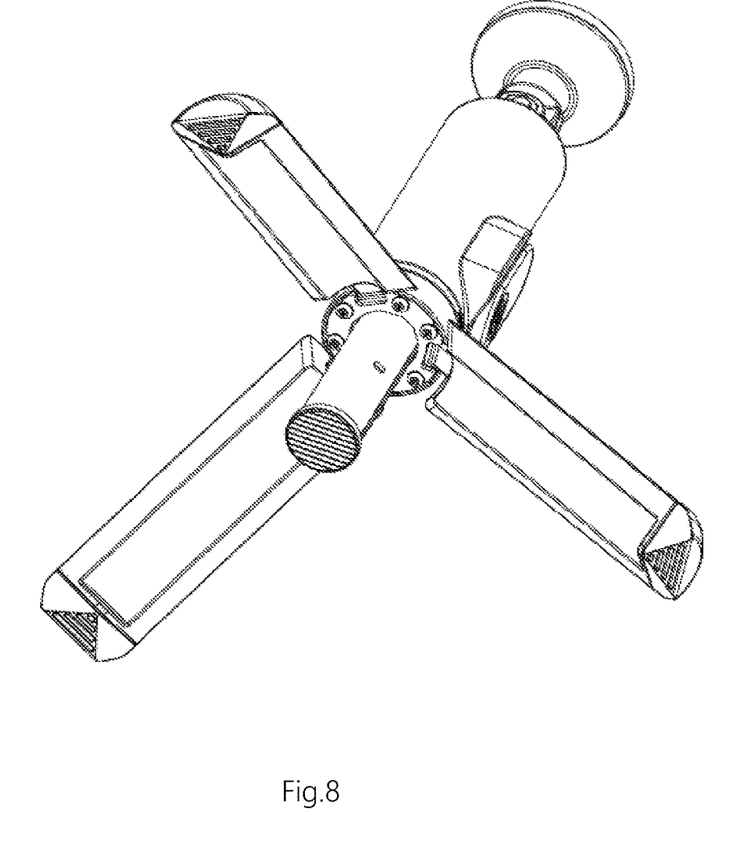
FIG. 8 is a schematic view for a tripod comprising the telescopic device of the current invention.

FIG. 8 is a schematic view for a tripod in one embodiment. A tripod comprises a base and three poles pivotally connected to the periphery of the base. Each pole comprises the aforesaid telescopic device.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A telescopic device comprising an outer pipe (1), an inner pipe (2) fitted in the outer pipe (1), and a sleeve (3) disposed between the outer pipe (1) and the inner pipe (2), one end of the inner pipe (2) extends out of the outer pipe (1), an outer surface of the inner pipe (2) is formed with a slide trough (21), an inner surface of the sleeve (3) is provided with a slide block engaged in the slide trough (21), at least one lock mechanism is provided between the outer pipe (1) and the sleeve (3), the lock mechanism comprises two bosses (5) to hold against each other, the two bosses are integrally formed on an inner surface of the outer pipe (1) and an outer surface of the sleeve (3) respectively, and the two bosses engage with or disengage from each other when the outer pipe (1) and the inner pipe (2) are turned relatively; wherein a gap at a radial direction is defined between the boss of the outer pipe (1) and the outer surface of the sleeve (3) except the boss of the sleeve (3); and another gap is defined between the boss of the sleeve (3) and the inner surface of the outer pipe (1) except the boss of the outer pipe (1).

2. The telescopic device according to claim 1, wherein a top end of the inner pipe (2) is installed with a positioning sleeve (4), and the positioning sleeve (4) is disposed above the sleeve (3).

3. The telescopic device according to claim 2, wherein the inner pipe (2) is formed with a positioning hole (22), and the positioning sleeve (4) is provided with a positioning block to mate with the positioning hole (22).

4. The telescopic device according to claim 3, wherein the positioning sleeve (4) is composed of two semi sleeves (41) to mate with each other.

5. The telescopic device according to claim 2, wherein the positioning sleeve (4) is integrally formed with another boss (5).

6. The telescopic device according to claim 1, wherein each boss (5) is a wedge disposed in an axial direction.

7. The telescopic device according to claim 1, wherein each boss (5) is a curved protrusion disposed in an axial direction.

8. The telescopic device according to claim 1, wherein the outer pipe (1) is formed with an elongate groove (12) in a circumferential direction, and the sleeve (3) is provided with a positioning stud (32) to slide in the elongate groove (12).

9. The telescopic device according to claim 1, wherein the outer surface of the sleeve (3) is formed with a groove (31), and the inner surface of the outer pipe (1) is provided with a protruding block (11) to slide along the groove (31).

10. A tripod comprising a base and three poles pivotally connected to a periphery of the base, wherein each pole comprises the telescopic device according to claim 1.

\* \* \* \* \*